US007445215B2

(12) United States Patent
Prather et al.

(10) Patent No.: US 7,445,215 B2
(45) Date of Patent: Nov. 4, 2008

(54) THEFT DEFEATING IMPROVEMENTS FOR SHOPPING CARTS

(75) Inventors: James G. Prather, Yorba Linda, CA (US); Patrick A. Maandag, Corona, CA (US); Harold Duffy, Inyokern, CA (US)

(73) Assignee: Mind Wurx, LLC, Yorba Linda, CA (US)

( * ) Notice: Subject to any disclaimer, the term of this patent is extended or adjusted under 35 U.S.C. 154(b) by 0 days.

(21) Appl. No.: 10/245,870

(22) Filed: Sep. 16, 2002

(65) Prior Publication Data

US 2004/0051263 A1 Mar. 18, 2004

(51) Int. Cl.
*B62B 3/00* (2006.01)
*G08B 13/14* (2006.01)

(52) U.S. Cl. ................................................ 280/33.994

(58) Field of Classification Search ............ 280/33.991, 280/33.992, 33.994, 43, 43.17, 43.24
See application file for complete search history.

(56) References Cited

U.S. PATENT DOCUMENTS

| | | | | |
|---|---|---|---|---|
| 3,333,860 | A * | 8/1967 | Kalpin | 280/29 |
| 3,361,438 | A * | 1/1968 | Davis | 280/33.991 |
| 4,242,668 | A * | 12/1980 | Herzog | 340/539.1 |
| 5,002,292 | A * | 3/1991 | Myers | 280/33.992 |
| 5,033,757 | A * | 7/1991 | Lloyd | 280/33.992 |
| 5,357,182 | A * | 10/1994 | Wolfe et al. | 318/379 |
| 5,836,596 | A * | 11/1998 | Wanzl | 280/33.991 |
| 6,264,217 | B1 * | 7/2001 | Le Roux | 280/33.994 |
| 6,271,755 | B1 * | 8/2001 | Prather et al. | 340/568.5 |

* cited by examiner

*Primary Examiner*—Frank B Vanaman
(74) *Attorney, Agent, or Firm*—Terrell P. Lewis

(57) ABSTRACT

An anti-theft system for a shopping cart includes a mounting structure for supporting anti-theft apparatus on the cart, the mounting structure being secured to the base frame of the cart. The anti-theft apparatus is removably carried by the mounting structure, with the anti-theft apparatus including a collapsible front suspension assembly having a housing; a first set of casters mounted to the housing, retractable pin elements carried by the housing and engagable with the mounting structure for maintaining the front suspension assembly in operative mode in which the first set of casters engage a supporting surface, a sensor assembly for detecting an activation signal and actuating the retractable pin elements to cause retraction of the pin elements and render the front suspension assembly inoperative, and a second set of casters fixed to the shopping cart base frame for preventing the cart from moving in a linear direction when the front suspension assembly is rendered inoperative.

25 Claims, 6 Drawing Sheets

FIG. 1a
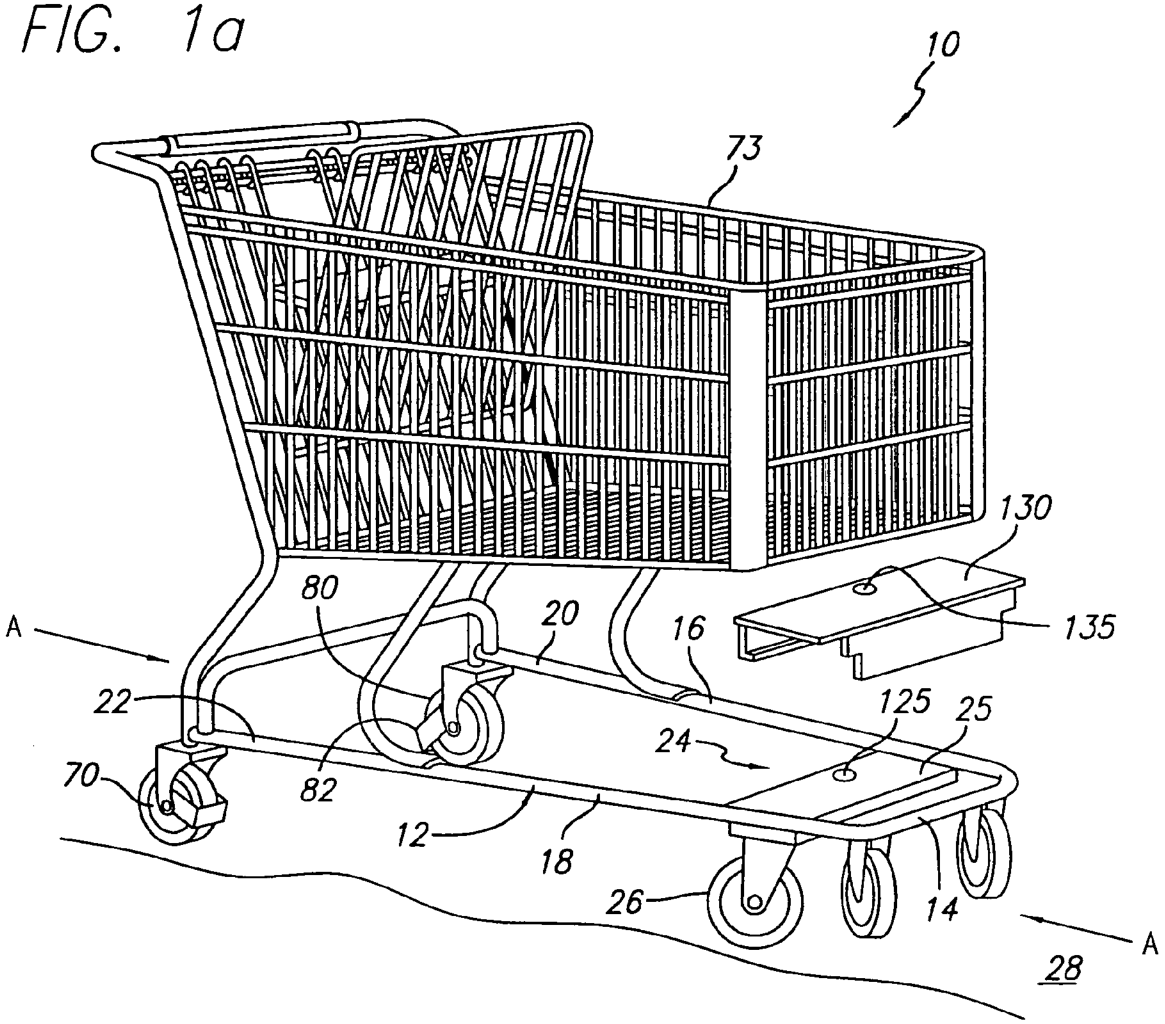
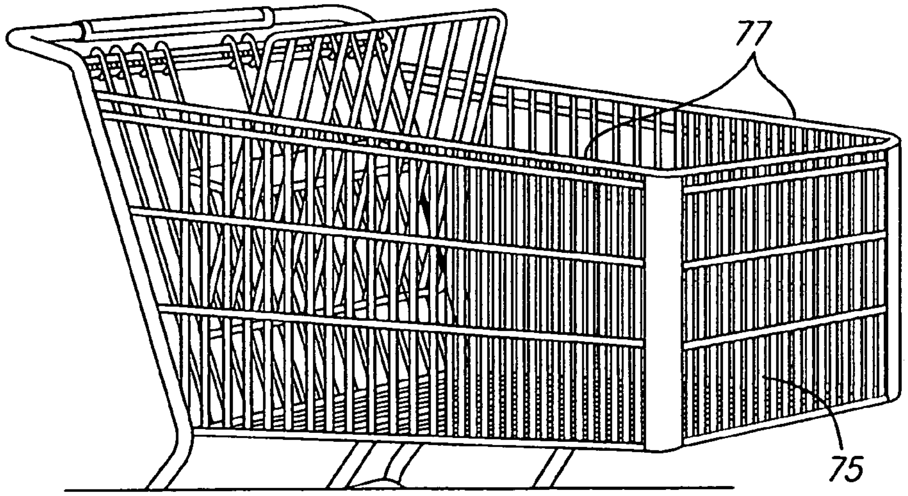
FIG. 1b

FIG. 3b
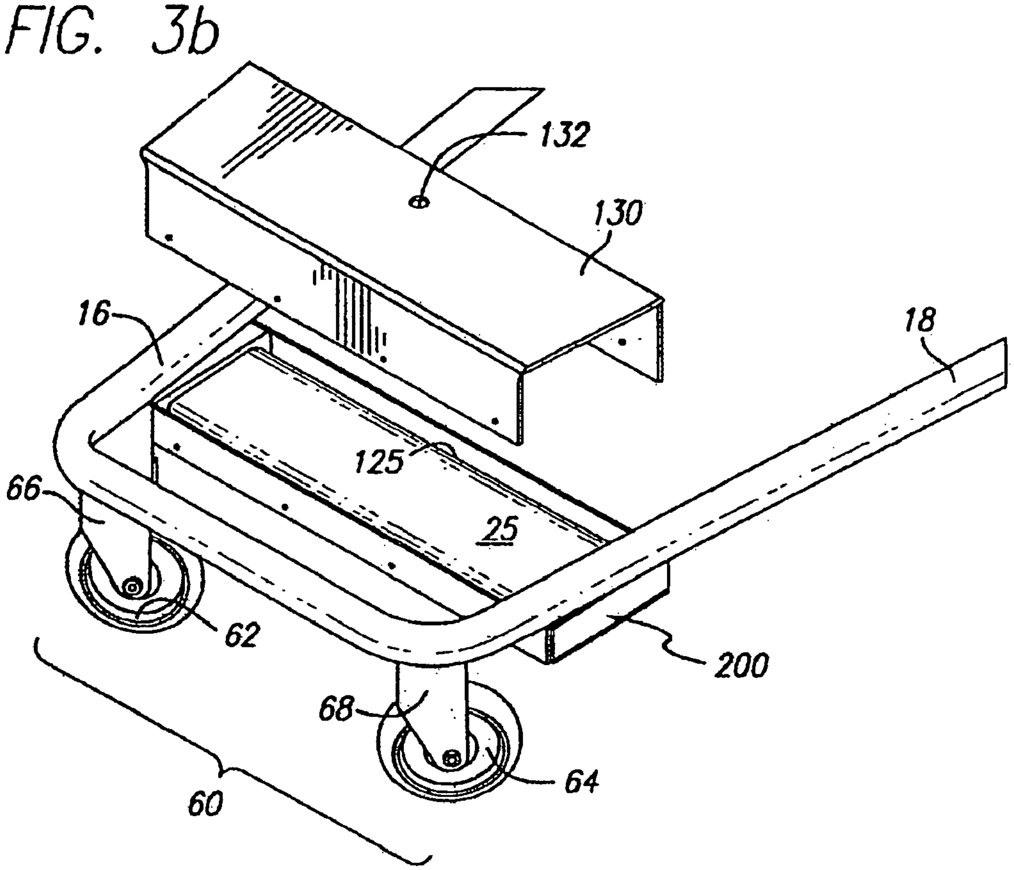
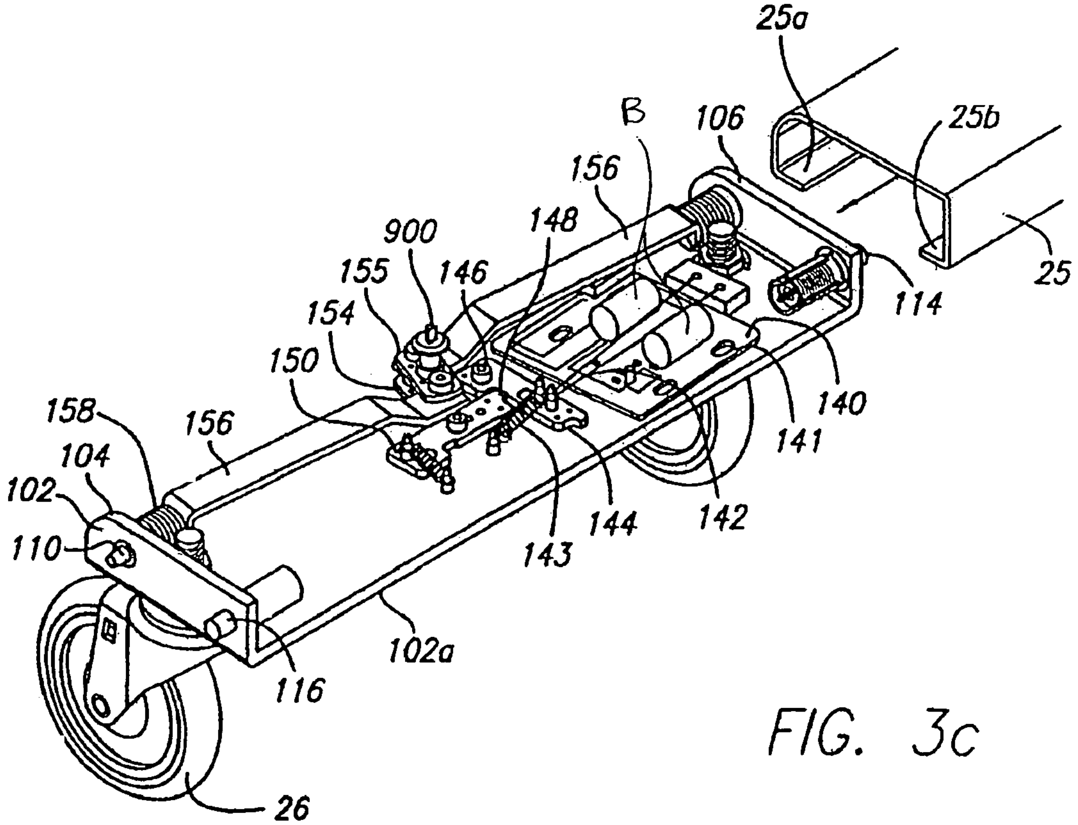
FIG. 3c

FIG. 3d
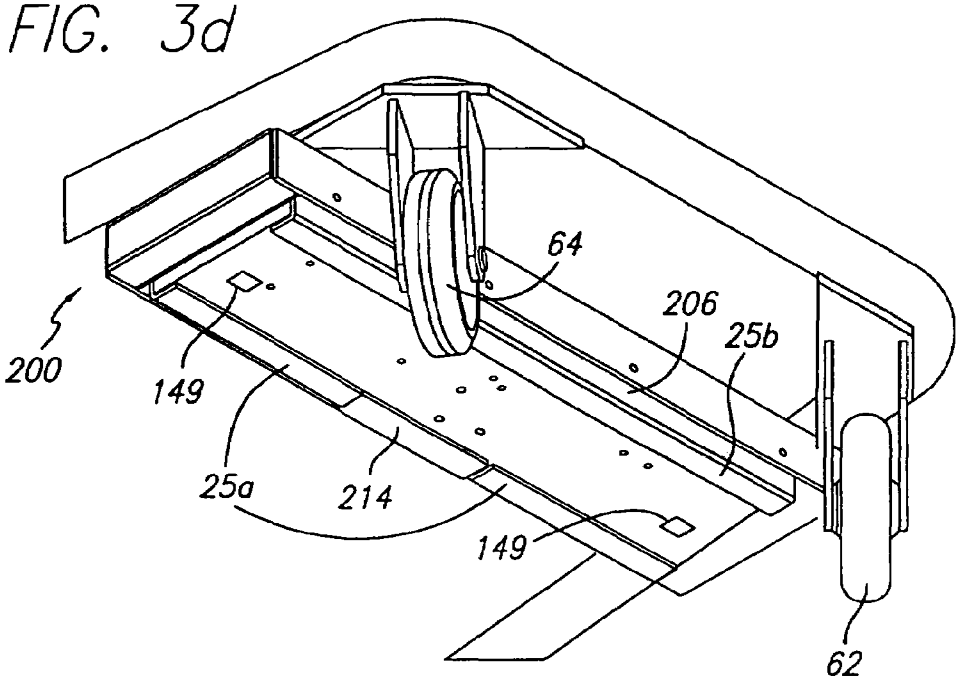
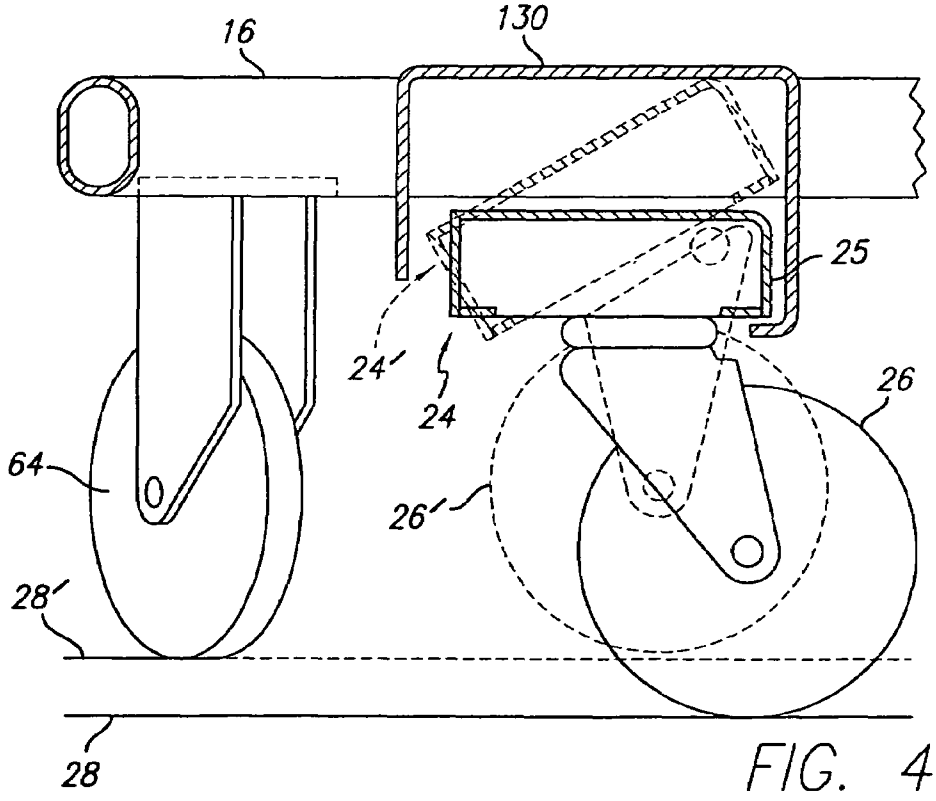
FIG. 4

FIG. 6
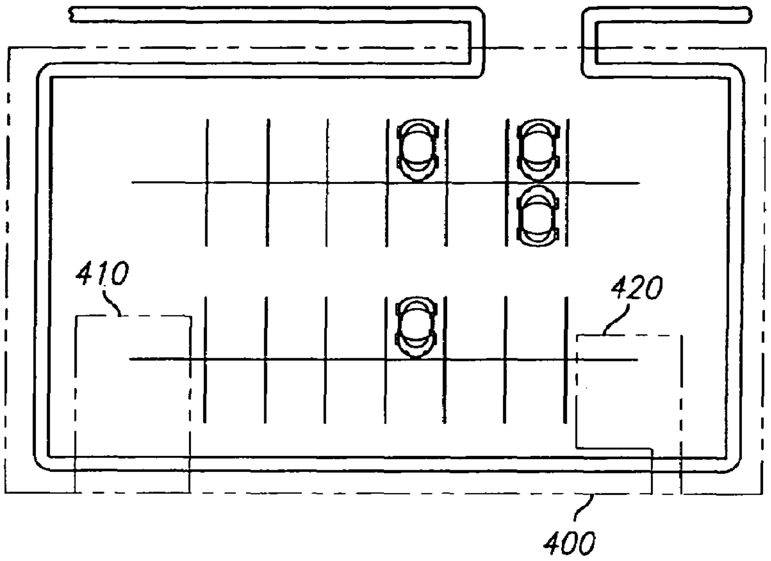
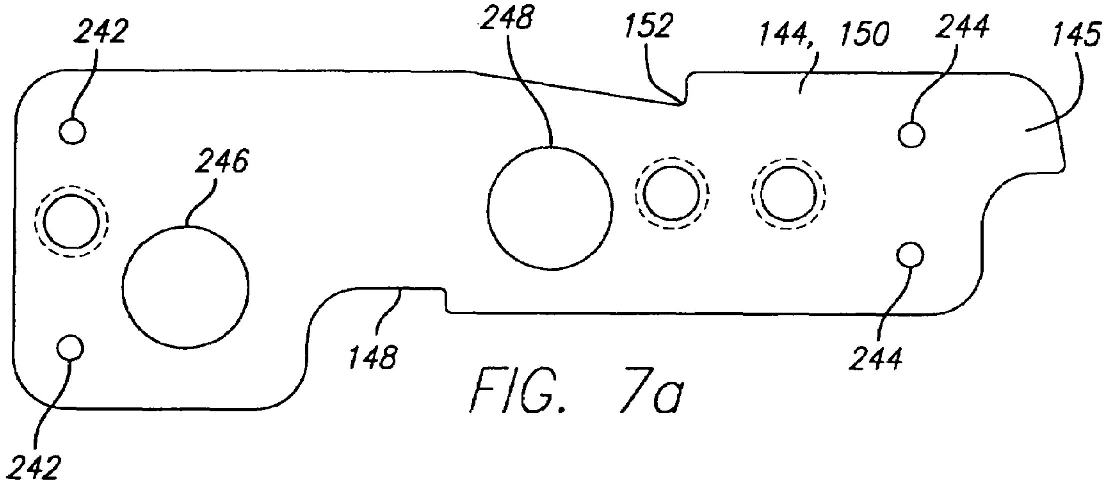
FIG. 7a
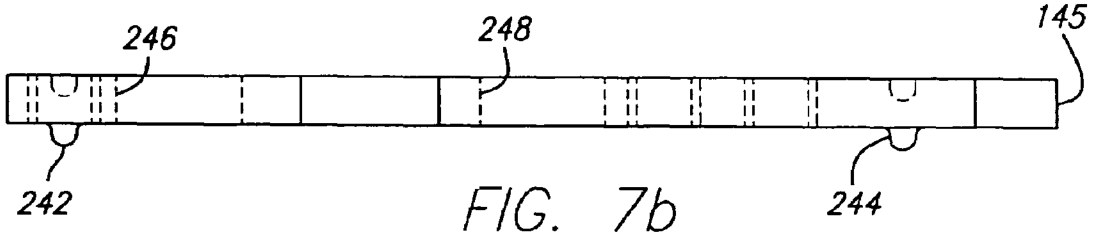
FIG. 7b

THEFT DEFEATING IMPROVEMENTS FOR SHOPPING CARTS

BACKGROUND OF THE INVENTION

1. Field of the Invention

This invention relates to theft-thwarting devices for preventing the loss of shopping carts from shopping stores. The invention disables operation of the front wheels of the cart, and keeps the cart from being pushed off the market premises or out of the parking lot once the front wheels are disabled. Other new theft-defeating features are incorporated in this invention.

2. Description of related Art

Millions of dollars are lost each year by grocery stores and shopping markets as a result of shopping cart theft. The expenses associated with shopping cart theft include costs for cart replacement, retrieval of carts taken off the premises, and rehabilitation of the carts once they are returned.

The prior art is replete with devices intended to prevent shopping cart theft, but none before applicants' invention have achieved such a result in the manner suggested by applicants. For example, U.S. Pat. No. 3,717,225 to Rashbaum (1973) discloses a piston rod and wheel lock device which includes a frame mounted actuator that locks one of the wheels of the cart. It does not eliminate the potential for the use of one bank of cart wheels rotating by lifting the disabled wheel from the contact with the ground. U.S. Pat. No. 5,315,290 to Moreno (1994) discloses an electronic wheel lock device, which also fails to eliminate the possibility of leaning the cart to the side of the still active wheels, and thus prevent cart theft. U.S. Pat. No. 4,242,668 to Herzog (1980) discloses a collapsible sub frame causing the wheels to swing out of operative position. This device immobilizes the front wheels of the cart, but does not eliminate the possibility the cart can be leaned back, and rolled away using the rear wheels of the cart. U.S. Pat. No. 5,357,182 to Wolfe et al. (1994) discloses a braked wheel device. This device also fails to eliminate the possibility of leaning the cart to the side of the still active wheels once the cart has left the boundary of the parking lot. U.S. Pat. No. 4,524,985 to Drake (1985) discloses an arrest device for a wheeled cart, which relies on a hooking device in the parking lot, but does not appear to eliminate the possibility that the cart could be leaned to one side to avoid the hooking device. Similarly, U.S. Pat. No. 5,576,691 to Coaklet et al. (1996) discloses another form of a wheel locking device that also fails to prevent the removal of the cart by a user who can simply tip the cart onto its back wheels and roll the cart away. U.S. Pat. No. 4,577,880 to Bianco (1986) discloses still another form of a wheel locking device that fails to eliminate the removal of the cart by simply tipping the cart on to the back wheels and rolling the cart away. U.S. Pat. No. 4,772,880 to Goldstein (1988) discloses another form of the wheel locking device, disabling only one of the front wheels. U.S. Pat. No. 5,194,844 to Zelda (1993) discloses a proximity wheel locking mechanism. This device also fails to eliminate the removal of the cart by simply tipping the cart on to the back wheels and rolling the cart away. U.S. Pat. No. 4,591,175 to Upton (1986) discloses a magnetic wheel locking mechanism. This device also fails to eliminate the removal of the cart by simply tipping the cart on to the back wheels and rolling the cart away.

Many of the devices disclosed by these patents demonstrate that disabling only one wheel of a shopping cart is insufficient to completely immobilize the cart, for even if one wheel is disabled, the person removing the cart can continue to push the cart with sufficient force to override the traction of the locked wheel. Moreover, a shopping cart of the Herzog design, in which the two wheels of the front wheel assembly were disabled by allowing the sub frame of the cart to collapse around the front wheel assembly, failed to prevent the leaning of the cart backwards over, and rolling it away on, its rear wheels.

Not one of these previously known devices totally prevents forward motion of the cart. If one wheel is locked, a person intent on removing the cart from the premises can exert enough force to overcome the friction of the locked wheel. If two wheels are disabled, as is taught by the Herzog patent, the cart can still be maneuvered by tilting the cart so that it can still be rolled away.

In U.S. Pat. No. 6,271,755 to Prather et al., there is disclosed a theft-thwarting mechanism for use with a shopping cart for preventing removal of the cart from the premises of a market. Also known is U.S. Pat. No. 6,054,923 to Prather et al. which discloses a shopping cart that includes a disabling mechanism that renders the cart's swivel wheels inoperative upon actuation of the disabling signal.

The object of these inventions was to make it nearly impossible for a person having the intent to remove the cart from the store's premises by rolling it away. In fact, tests performed by applicants have shown that cart losses due to theft, during a six-month test period, were virtually non-existent. However, various drawbacks and difficulties have since been noted, which the present invention seeks to cure. The present invention is drawn to improvements over the previously presented subject matter, and incorporates additional shopping cart theft thwarting features.

For example, in the past, the cover for the front wheel suspension assembly was easily removable just by removing the fasteners that secured the cover to the suspension assembly. The present invention proposes a solution. In the past, often after repeatedly resetting the cart disabling mechanism, the reset wand failed to properly engage the reset screw associated with the disabled mechanism and resetting was prevented. The present invention provides a novel solution to this difficulty. In the past, various attempts have been made to remove the wheels attached to the front wheel suspension assembly. The present invention offers a solution to this problem.

BRIEF DESCRIPTION OF THE DRAWINGS

Still further objects and advantages will become apparent from a consideration of the ensuing description and drawings, in which:

FIG. 1*a* shows an anti-theft shopping cart 10 according to the present invention including a base frame 12 and a basket 14, and in which a front wheel suspension assembly of the cart is in a functional, operative, position;

FIG. 1*b* shows a variation of basket according to the present invention in which the vertically extending wires at the front of the basket have been doubled in number in the front and side vertical panels of the basket;

FIG. 3*b* shows the mounting box member affixed to the underside of the base frame 12;

FIG. 3*c* depicts the components of which the front wheel suspension assembly of the cart is comprised;

FIG. 3*d* is a view of the underside of the front of a shopping cart modified in accordance with the invention showing the mounting box member 200 and pair of fixed directional casters;

FIG. 4 is a schematic drawing showing the collapsible front suspension assembly 24 in operative and disabled states, and its functional relationship relative to the fixed directional casters;

FIG. 6 schematically shows a parking lot with markings to define boundaries beyond which the front suspension assemblies of the carts will be triggered, as well as buried electrical conduits (shown in phantom) disposed in a primary loop and in secondary loops, the conduits being used to generate triggering signals according to the invention; and FIGS. 7*a* and 7*b* show details of pivoting members 144 and 150.

DESCRIPTION OF THE PREFERRED EMBODIMENTS

Figure 2:
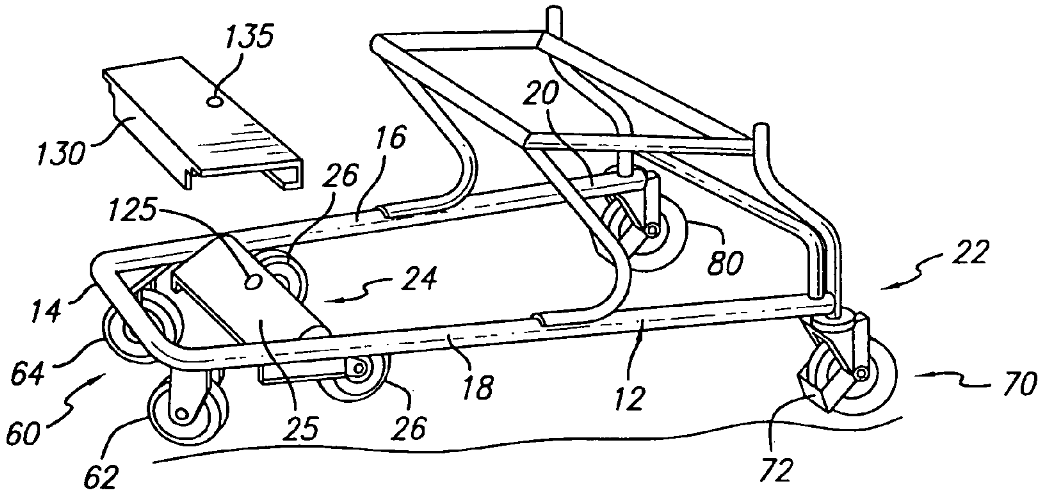
FIG. 2 shows the shopping cart base frame 12 (without the basket) with the front wheel suspension assembly of the cart in a disabled, non-functional, "triggered" state and the fixed directional casters in an enabled, functional, state.

Referring now to the drawings in which like reference numerals refer to like elements throughout the figures, a shopping cart 10 according to the present invention has a basket 73 and a U-shaped base frame 12 comprising a front member 14 and two side members 16 and 18 extending rearwardly therefrom. The side members 16 and 18 have back ends 20 and 22 respectively.

FIG. 1*b* depicts a basket in accordance with the present invention in which the vertical wire count in the forward portions of the side panels and the front panel of the basket has been doubled up. This makes it impossible for a person with intent to steal a shopping cart to insert his fingers between the wires in order to lift the front of the cart off the ground and then walk the cart away from the store premises in an attempt to defeat the effect of the otherwise disabled cart.

Figure 3A:
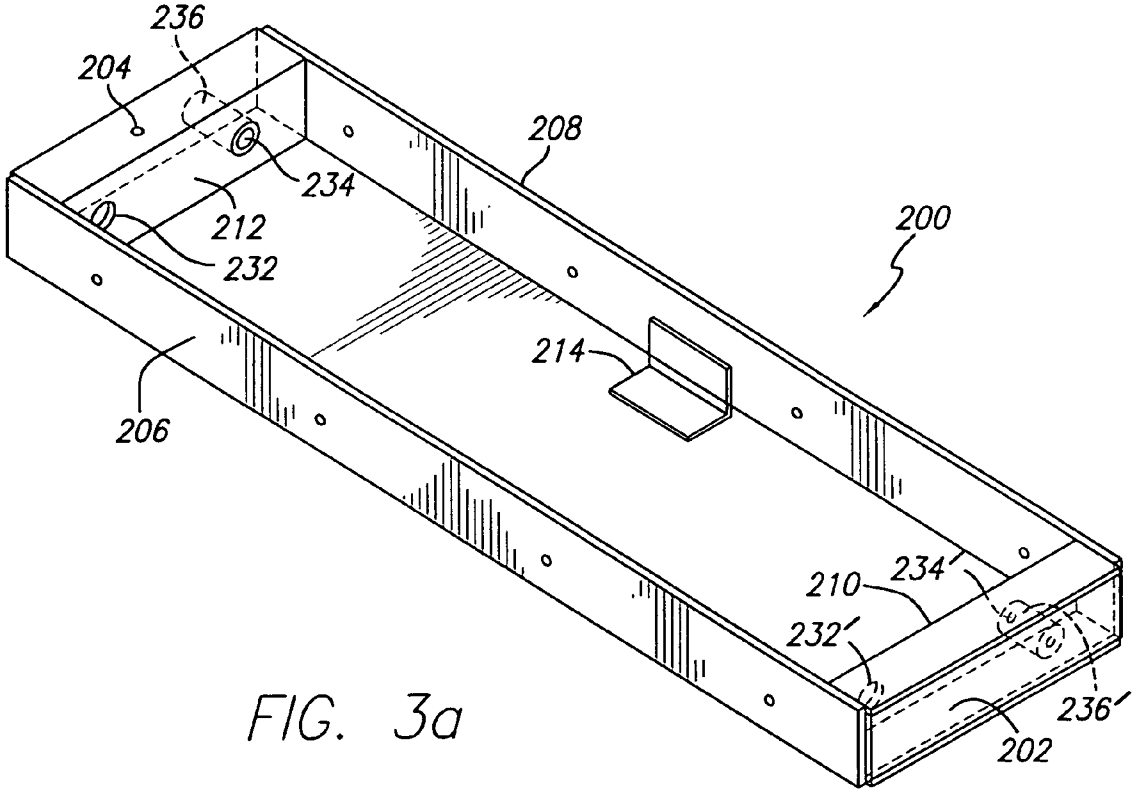
FIG. 3*a* shows details of a mounting box member which is utilized to mount the collapsible front suspension assembly to the base frame 12 of the shopping cart.

A collapsible front suspension assembly 24, shown in an untriggered functional state in FIG. 1, and a triggered disabled state in FIG. 2, extends between the two side members 16 and 18 at a location adjacent the front member 14 of the base frame 12. Details of the suspension assembly 24 are shown in FIG. 3*c*, and are described below. The front wheels 26 of the cart are supported on the underside of the suspension assembly 24. A protective guard or shield 25 is secured to and over the suspension assembly 24 once it is properly seated in the box member 200. The channel-shaped shield 25 having inwardly facing legs 25*a*, 25*b* is configured to be laterally slid over the suspension assembly 24 (see description below). A cover 130 is attached over the shield 25. Both the cover 130 and the protective shield 25 are provided with openings (see openings 125 in the cover 25 and opening 135 in the shield 130) for external access to the "reset" mechanism (described below) of the suspension assembly. The protective guard or shield 25 is mounted and secured over the cover 130 and to the suspension assembly of the cart to prevent undesired access to the suspension assembly.

Also supported by the side members 16 and 18, and the front member 14, at a more forward position (see FIGS. 2, 3*b* and 3*d* in particular) is a fixed direction caster asssembly 60 comprising a pair of wheels or casters 62, 64 that are arranged at an acute angle to the longitudinal axis of the base frame 12 and respective support members 66, 68 (see FIG. 3*b*) from which are supported the casters 62, 64 to the base frame 12 of the shopping cart 10.

A mounting box assembly 200 (see more specifically in FIGS. 3*a*, 3*b* and 3*d*), in which the suspension assembly 24 is disposed and by which it is mounted to the base frame of the cart, is seen to comprise outer longitudinal side walls 202, 204 and lateral walls 206, 208 spanning and interconnecting at right angles the longitudinal side walls. Disposed parallel to the outer side walls and spaced inwardly therefrom are a second set of lateral walls 210, 212. An L-shaped supporting flange 214 is attached to the rearmost lateral wall 208 at the lower portion thereof and functions as a seat for supporting the suspension assembly 24 when the latter is secured in the box assembly 200. Each of the inner side walls has a pair of spaced apart openings 232, 232', 234, 234' with the openings 232 and 232' being laterally aligned with each other, and the openings 234 and 234' being laterally aligned with one another. Bushings 236, 236' are positioned between the inner and outer side walls of the box assembly for receiving the laterally outer ends of the pins 158 of the suspension assembly. These paired, laterally aligned sets of openings, combined with the bushings 236, 236' are for the purpose of mounting the suspension assembly 24 in the box assembly 200 (in a manner described below). Once the suspension assembly has been properly placed in the box assembly 200, the cover 25 is secured to the box assembly 200 via rivets or other fasteners which engage with openings 238, and the shield 130 is then mounted atop the cover 25. The cover 25 of the box assembly 200 essentially renders the suspension assembly tamper proof.

FIG. 2 shows the collapsible front suspension 24 in a collapsed state.

FIG. 3*c* depicts a U-shaped tray-like support 102 for supporting the triggering mechanism for the front suspension. Support 102 has a forward end 102*a* and a rearward end opposite the forward end. As shown, the longitudinally extending sides of the support 102 each has an upstanding laterally extending edge portion 104 and 106. Each one of a pair of swivel wheels 26 is attached to the support 102. Each of the wheels includes a substantially cylindrical threaded stud or bolt which is inserted through a polygonal opening 149 (see FIG. 3*d*) in the floor of the support 102, and on which a lock nut is threaded and turned to secure the wheel to the underside of the support 102. Immediately below the stud is a portion that includes ears or other similar radially projecting protrusions. These ears lodge in the openings in the floor of the support to lock the wheel studs against rotation relative to the support 102, thereby making it impossible to remove the wheels 26 once they have been assembled to the support 102 and the cover 25 has been secured on the mounting box assembly 200.

The support 102 has two release pins (only pin 110 is shown in FIG. 3*c*) located at lateral sides of the support 102 and extending from a centrally located pivot area to and through the opposing edge portions of the support. The two release pins are movably mounted relative to the support and to one another (described below in greater detail) such that the outer ends of the pins are extendable beyond the exterior side surfaces 104, 106. This is to permit the outer ends of the pins to extend into the openings 234, 234' in respective bushings 236, 236' located between the respective side members 202, 210 and 204, 212 of the rectangular mounting box member 200. Preferably, the outer end surfaces of the release pins are beveled to reduce the amount of force that is required to insert and extract the pins from the bushings. The support 102 also has a pair of spring-biased, retractable, hinge pins 114, 116 extending along the forward edge of the support. Each hinge pin is biased laterally outwardly of the support 102 and has an outer end extending beyond the exterior sides 104, 106 of the support. The pin outer ends are linearly aligned and engage in correspondingly situated openings 232, 232' in respectively adjacent side members 212, 210 of the mounting box member 200. Other embodiments of the invention may have a single hinge rod having opposing spring-biased end elements that perform a similar function as the two hinge pins. Another acceptable arrangement would encompass a solid, single-piece, hinge rod with ends that function as the pins.

FIG. 4 is a partially cross-sectional view showing the suspension assembly in a non-collapsed, functional, orientation designated by the solid lines and a collapsed, non-functional, orientation designated by the dotted lines. When the suspension assembly becomes disabled and collapses, the fixed casters (only caster 64 is shown since FIG. 4 is a side view of the forward region of one longitudinal half of the base frame) drop downwardly toward the surface 28, placing the wheels 62, 64 of the fixed directional caster assembly 60 in contact with the surface 28, and thereby inhibiting the shopping cart 10 from being pushed forward for any substantial distance. In fact, once the wheels 62, 64 make contact with the surface 28, motion of the shopping cart is constrained to circular motion only, in the direction in which the two wheels 62, 64 are directed, as long as the collapsible suspension assembly remains disabled or collapsed. It is to be understood that when the collapsible suspension becomes disabled, the weight of the shopping cart is absorbed by the wheels 62, 64, and the momentum of the cart is re-directed to circular motion only. Moreover, the combination of the collapsible suspension assembly with the fixed directional caster assembly prevents destruction of cart caster components when the collapsible suspension assembly becomes disabled, as is the case with various devices taught by the prior art, and also prevents injury to customers by absorbing the weight of the cart and smoothly redirecting motion instead of abruptly ceasing motion.

The suspension assembly of the cart is disabled by a triggering signal, such as an audio, magnetic or radio frequency signal, which is detected when the cart is pushed past a signal emitting member, such as an underground cable or a line-of-sight emitter. A sensor assembly 140, mounted on the support 102, detects the triggering signal. The sensor assembly transmits a disabling signal via a trigger conduit 142 (eg, a wire) when a triggering signal is detected. Designs for sensors of the type needed to detect a triggering signal are well known in the art. Preferably, the sensor assembly 140 and the disabling signal produced thereby is powered by batteries B mounted on and carried by the suspension assembly. The sensitivity of the sensor assembly's trigger signal detecting capability can be adjusted by moving the sensor assembly toward or away from the pivoting member 144. Such adjustability is enabled by slots 141 formed in the sensor assembly substrate. When a triggering signal is sensed, the sensor assembly 140 transmits a disabling signal to activate the mechanism for retracting the pin ends. The disabling signal preferably is an electrical current from the batteries to a titanium nickel wire 142. The alloy of wire 142 has the property of contracting when heated. Thus, the current from the batteries heats the wire and causes it to contract. The invention also contemplates the use of other resistive materials that contract upon heating. Wire 142 is mounted to the sensor assembly substrate and extends to and from mounting pins on the pivoting member 144.

Referring again to FIG. 3*c*, as well as FIGS. 7*a* and 7*b*, it will be noted that the contracting of the wire 142 moves a member 144 about a pivot point 146 against the tension of one or more spring elements 143 (FIG. 3*c* shows two such spring elements). As the member 144 pivots about the pivot point 146 toward the sensor assembly 140, a notch 148 on the member 144 disengages from holding a tail portion 145 (see FIGS. 7*a* and 7*b*) on the pivoting member 150. As a result, the member 150 pivots, thereby moving a notch 152 on the rear side of pivoting member 150 from engagement with the side of a pivoting member 154, which in turn is rotatably mounted to the support 102. Most preferably, the pivoting members 144 and 150 are identical, thereby saving manufacturing costs and reducing the number of parts that are required. The the pivoting members 144 and 150, as well as the pivoting members 154 and 155, are formed with sets of dimples 242, 244 at various regions thereof. Preferably, the dimples are formed via a stamping process, and act as bearings to reduce friction as well as to prevent the build-up and collection of debris which will hamper, or even prevent (after enough time), movement of the pivoting members 144 and 150. Through-bores 246 and 248 in pivot members 144 and 150 enable interchangability of the pivoting members 144 and 150 by permitting either through-bore to act as the pivot point, with the preferred arrangement of pivoting members being depicted in FIG. 3*c*.

The release pins 110 and 112 are connected to the pivoting member 154 via rigid linking members 156 such that when the pivoting member 154 pivots in one direction, the pins 110 are driven to extend beyond the side 102, 106 of the support 102 into the bushings 234, 234' in the support box member 200, and when the pivoting member 154 pivots in an opposite direction, the pins 110 are retracted from the bushings. Springs 158 are disposed about the release pins, and between the respective linking member 156 and the support sides 104,106 such that the springs urge the release pins to retract. This arrangement permits the release pins to retract when the notch 152 is removed from the side of the second pivoting member 154.

After the suspension assembly 24 has been triggered into the inoperative position, whereupon forward or rearward motion of the cart is controlled by the fixed directional casters 62, 64, the batteries continue to discharge and generate the triggering current. This leads to premature draining of the battery power, even if rechargable batteries are used. To prevent this condition when the suspension assembly is not reset within a predetermined time, a switch, placed in the circuitry between the batteries and the trigger wire, is opened to disconnect the batteries (or other power source when used) from the trigger wire (i.e., the load) to prevent continuous drain of power following triggering of the suspension assembly into its inoperative state.

When the suspension assembly is reset (i.e., the release pins 110 are reset to their extended positions so that the suspension assembly 24 once again becomes operative, as seen in FIG. 1), the switch is closed so that power to the triggering mechanism can again be tapped whenever the cart sensor assembly detects a triggering signal.

Figure 5A:
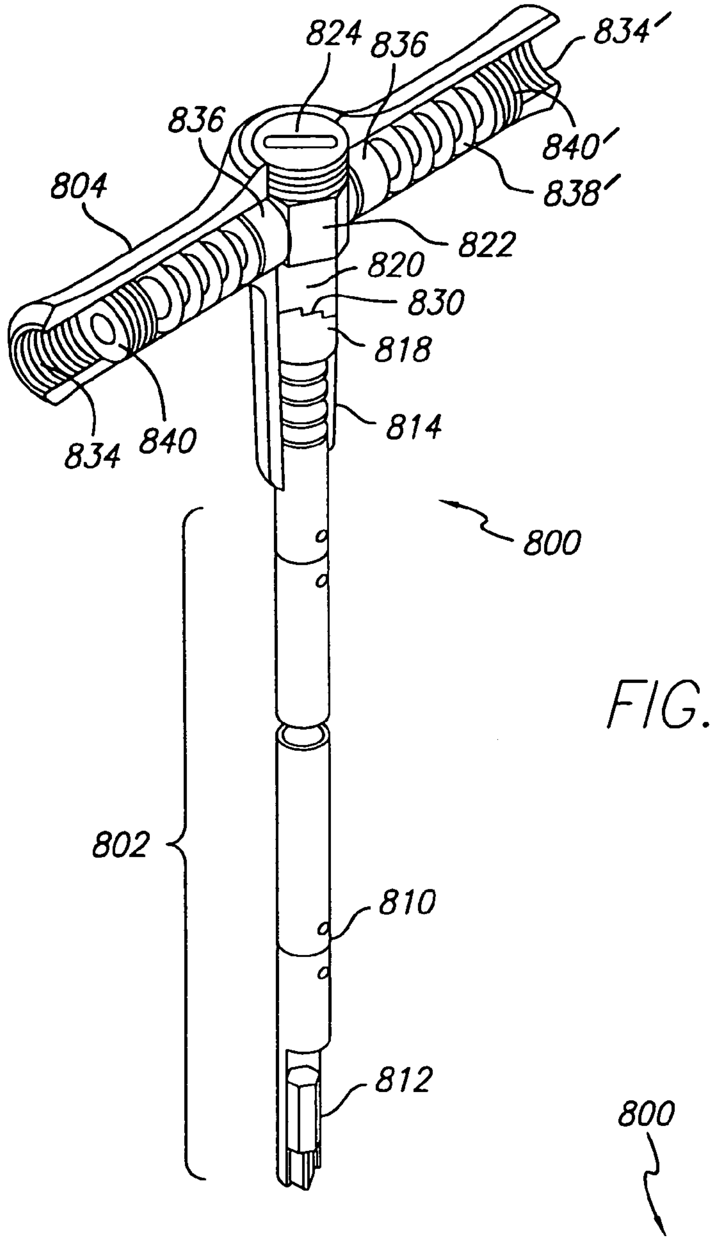
FIG. 5*a* is a perspective, partial sectional, view of a tool designed for resetting the disabled collapsible front suspension of the shopping cart 10 shown in the figures above.
Figure 5B:
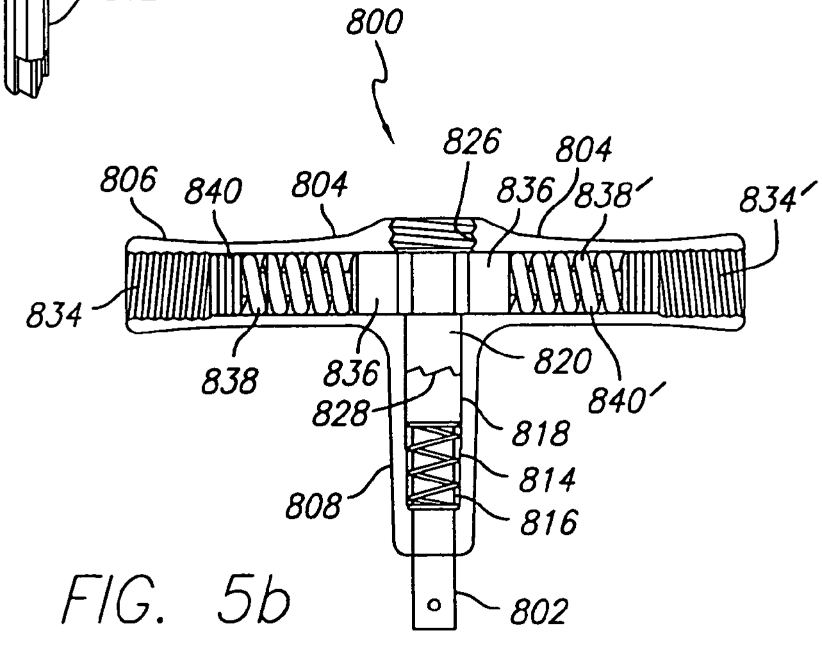

To reset the release pins 110 into their extended position, the pivoting member 154 is rotated or pivoted such that the release pins are caused to extend beyond the support sides 104, 106 and the notch 152 is re-engaged with the side of the pivoting member 154. This is accomplished by engaging a reset tool 800 (shown in FIGS. 5*a* and 5*b*, and described in greater detail below) with a tamper proof screw 900 and rotating the pivoting member 155 by rotating the screw 900.

Preferably, the screw 900 has a polygonal exterior shape which can only be engaged by a tool possessing a complementarily configured recess. The purpose behind this mutuality of configuration is to insure a positive interlock between the screw and the tool used to turn the screw, without causing damage to either. Different sizes of the screw head can be used, and many different shapes of the screw head can be envisioned, including triangular (as shown in the drawings), star, diamond, cross-shaped, rectangular, square, etc. In this way, there can be an array of screw head configurations that work with different tool engagement zones, where the one constant is the depth of penetration into the tool engagement zone for a positive interaction between screw and tool with concomitant reduction of slippage of the screw head in the tool engagement zone A huge advantage of the variation in configurational engagement is that the tools and screws can be customized for each market chain. It is to be understood that the engagement zone of the tool is that end region which is intended and configured for engagement with the screw, and further that the screw and the tool engagement zones can be either male or female, with a preferred arrangement being a male screw head engagement zone and a female tool engagement zone for receipt of the male screw head engagement zone.

The tool 800 is designed to limit the amount of torque delivered to the screw 900. The reset tool 800 comprises an elongated body shaft portion 802 having a handle portion 804 at the upper end thereof. The handle portion includes a horizontally extending housing 806 and a short vertically extending shaft housing 808. The handle portion is rotatably mounted to the shaft portion 802 of the tool The shaft portion can be fitted at its reset screw-engaging end 810 with a removable tool socket 812 having an internal, polygonal, receptacle configured to engage the polygonal exterior of the reset screw 900. At the upper end of the reset tool shaft portion 802 is a spring 814 which sits concentrically about the shaft portion of the tool. The lower end of the spring 814 sits against a shoulder 816 inside the shaft housing. Urged upwardly, or away from the reset screw-engaging end 810 of the shaft portion, is a lower slip gear 818 positioned above the spring 814, an upper slip gear 820 seated on the lower slip gear, a pivot 822 having lateral facets, and a spring plug 824 that can be rotated with a tool (not shown), such as a flat-head screw driver or other implement that can engage a slot or other similar engagement surface on the upper side of the spring plug 824 The spring plug 824 is provided with external threads and is adjustably housed inside a threaded bore 826 for adjusting the pressure on the upper and lower slip gears. It should be noted that the lower and upper slip gears bear facing, engaging, beveled gear teeth 828, 830 permitting rotation of one slip gear relative to the other in one direction only. The tool handle portion includes radially extending, diametrically opposed housings, each having a threaded bore 834, 834' extending partially inward from the outer end of the respective housing. A spring alignment seat 836 is positioned in abutment with the pivot of the reset tool in each of the handle portion housings. Situated radially outwardly from the spring alignment seat 836 in each tool handle portion housing is a coil spring 838, 838', and then even further radially outwardly Is an externally threaded spring plug 840, 840' which makes threaded engagement with the threading in the bore 834, 834' in each of the tool handle portion housings. By adjusting the radial portion of the spring plugs relative to the pivot against the spring action of the springs 838, 838', a predetermined pressure can be applied to the pivot element so that slippage of the handle portion as it rotates on the shaft portion of the tool can be controlled, while ensuring that a limited torque will be applied through the shaft portion of the tool to the reset screw 900. The slip gears also ensure that the end of the tool shaft portion can be maintained in contact with the reset screw 900 throughout the entire reset process, thereby eliminating the possibility of slippage of the tool shaft end portion off the reset screw.

The shopping cart 10 preferably may also have theft-deterring wheels or casters at the rear end of the cart. These casters can be of two types—a pivotable caster 70 mounted for pivoting movement about its attachment to the base frame of the cart, or a fixed caster 80 fixedly mounted to, and at an attachment location on, the base frame of the cart (see FIGS. 1 and 2). Insofar as a pivotable caster typically can pivot freely about the attachment spindle with which it is attached to the base frame of the cart, preferably each caster 70 is provided with a forward facing stop dog that will face rearwardly when the cart is tilted backward onto its rear casters and the caster 70 pivots about it spindle 180°.

Preferably, each pivotable caster 70 (a cart may have two pivotable casters at the rear end) on the cart includes a U-shaped strap 72 which is positioned in a forward-facing manner, while each fixed caster 80 on the cart includes a U-shaped strap 82 facing rearwardly. The straps 72, 82 are provided as a means of preventing the cart from being moved in the direction in which the strap faces. Thus, the strap functions as a "stop dog" to further inhibit the shopping cart 10 from being pushed forwardly or rearwardly after the front suspension assembly has been disabled. Non-rotatable, fixed, wheels are prevented from rotating in a plane that is parallel to the surface 28.

If the front member of the cart is tilted upwardly to facilitate the rearward wheeling away of the cart on its rear wheels, the stop dogs on the rear wheels will assist in preventing this by the engagement of the bottom edge 82 of the stop dogs with the surface 28. It is to be noted that the pivotable caster 70, as shown in FIGS. 1 and 2, is reversed, with the strap or stop dog facing forwardly. The purpose of this is to insure that motion of the cart would be thwarted if, when the front member 14 of the cart is tilted upwardly, a would-be thief instead tried to wheel the cart away in a forward direction. It is to be further noted that both rear casters on the cart 10 may be fixed casters or rotatable, and further that the rear casters may be one each of fixed and rotatable.

Referring now to FIG. 6, the invention contemplates surrounding the perimeter of the area of protection (eg, a parking lot) with a main loop of cable or wire 400 that emits a "triggering" signal. Secondary loops 410 and 420 may also be provided to encircle cart corrals or other areas where it is desired to store or otherwise hold carts for later use. Once the shopping cart 10 is pushed past the signal-emitting boundary, the front suspension 24 collapses, thereby disabling the shopping cart.

The present invention may be embodied in other specific forms without departing from the spirit or essential attributes. For example, the collapsible front suspension may be retrofitted onto existing shopping carts according to an embodiment of the invention, wherein the collapsible front suspension assembly is premounted in the mounting box assembly 200 and then the entire combined assembly is secured to a conventional shopping cart. Furthermore, once a conventional shopping cart has been so modified, the suspension assembly 24 may easily and quickly be inserted or removed (eg, for servicing) from the mounting box assembly 200 without having to dismantle any components on the so-modified shopping cart. Moreover, the rear casters on the shopping carts can be interchanged so that the carts can have different types of rear casters or the same type of rear casters. Accordingly, reference should be made to the appended claims, rather than to the foregoing specification.

We claim:

1. An anti-theft system for a shopping cart having a wheeled base, comprising:

a rectangular mounting structure including a recessed horizontal surface adapted for supporting an anti-theft apparatus therein to the base of the cart, said mounting structure laterally spanning, and being secured to, the underside of the base of said cart, anti-theft apparatus removably carried on the horizontal surface of the mounting structure, said anti-theft apparatus comprising a collapsible front suspension assembly including a housing; a first set of casters mounted to said housing, retractable pin elements carried by said housing and engagable with said mounting structure for maintaining said front suspension assembly in an operative mode in which said first set of casters engage a supporting surface, a sensor assembly for detecting an activation signal and actuating said retractable pin elements to cause retraction of said pin elements and render said front suspension assembly inoperative, and a second set of casters fixed to said shopping cart base frame for preventing said cart from moving in a linear direction when said front suspension assembly is rendered inoperative.

2. The anti-theft system of claim 1, wherein said first set of casters are swivel casters and said second set of casters are mounted on said shopping cart base frame forwardly of said first set of casters.

3. The anti-theft system of claim 2, wherein said second set of casters comprises wheels spaced apart and arranged parallel to one another.

4. The anti-theft system of claim 2, wherein said second set of casters comprise a pair of wheels arranged parallel to one another and disposed at an acute angle to the longitudinal axis of the shopping cart.

5. The anti-theft system of claim 1, wherein said mounting structure for supporting said anti-theft apparatus on the cart comprises a substantially rectangular box within which said collapsible front suspension is secured.

6. The anti-theft system of claim 5, wherein said substantially rectangular box is arranged with longer sides of said box spanning the width of said shopping cart base, and wherein said box further includes sleeves mounted in the shorter sides of the box for receipt of the ends of said pin elements.

7. The anti-theft system of claim 6, wherein ends of said pin elements are bevelled.

8. The anti-theft system of claim 6, wherein said suspension assembly further comprises a reset fastener projecting from the anti-theft apparatus which permits the retracted pin elements to be reset into a position where the pin elements are re-engaged with the sleeves in said box.

9. The anti-theft system of claim 8, and further including a tool for engaging said reset fastener, said tool having gearing that permits one-way non-slip rotation of the reset fastener.

10. The anti-theft system of claim 9, wherein said tool includes torque limiting means for preventing failure of said tool.

11. The anti-theft system of claim 9, wherein said tool includes torque limiting means for preventing failure of said reset fastener.

12. The anti-theft system of claim 5, wherein said first set of casters are pivotably mounted to said box.

13. The anti-theft system of claim 12, wherein said first set of casters, once secured in said housing, are prevented from being removed.

14. The anti-theft system of claim 1, and further including biasing means for driving said pin elements in a direction toward one another when said front suspension system becomes inoperative.

15. The anti-theft system of claim 1, wherein the suspension assembly further includes a pin movement assembly for moving said pin elements from a first position in which said pin elements extend beyond side portions of said mounting structure and engage in said mounting structure, and a second position in which the pin elements do not extend beyond the side portions of said mounting structure.

16. The anti-theft system of claim 15, wherein said pin movement assembly comprises a pivoting member rotatably mounted to the mounting structure and a rigid linking member extending from the pivoting member to an inner end of each of the release pin elements, respectively, and further wherein the release pin movement assembly is arranged such that rotation of the pivoting member in one direction effects movement of the release pin elements to said first position and rotation of said pivoting member in an opposite direction effects movement of the release pin elements to said second position.

17. The anti-theft system of claim 16, wherein (a) the means for effecting release movement of the pin elements comprises means for holding the pivoting member in said first position, (b) said sensor assembly further comprises a metal trigger wire that contracts when heated, the trigger wire being attached to the holding means such that contraction of the trigger wire results in the holding means releasing the pivoting member, and (c) said pin elements are biased into engagement with said sleeves in said box.

18. The anti-theft system of claim 17, wherein said trigger wire is comprised of titanium nickel.

19. The anti-theft system of claim 1, wherein said shopping cart further includes a set of casters on the rear of said cart, at least one of said casters being rotatably mounted to the cart, and motion stopping means coupled to said at least one caster for locking said caster against rolling motion when the front of said cart is tipped backward over said casters at the rear of said cart.

20. The anti-theft system of claim 1, and further comprising a cover for enclosing the anti-theft apparatus, said cover being channel-shaped for attachment to the housing by lateral engagement of the cover over the housing from one side of the housing to the other.

21. The anti-theft system of claim 1, and further including sensor means for transmitting a trigger signal to collapse said front suspension assembly when a disabling signal is detected, said disabling signal causing said suspension assembly to become inoperative, and a second set of casters becoming operative to absorb the weight and momentum of said shopping cart when said first set of casters is rendered inoperative.

22. The shopping cart of claim 21, wherein said second set of casters comprises wheels mounted at an angle to the longitudinal axis of said shopping cart frame, and further becoming operative to redirect the momentum of said shopping cart to non-linear motion when said first set of casters becomes inoperative.

23. The shopping cart of claim 21, the sensor assembly further comprising a trigger wire, wherein the trigger signal detection sensitivity of said sensor means is adjustable through adjustment of the position of said sensor means relative to said trigger wire.

24. A process of preventing shopping cart theft comprising the steps of a. providing the shopping cart of claim 1, and b. generating a trigger signal along a perimeter of an area.

25. The process of claim 24, wherein said area comprises several zones about the perimeter of which said trigger signal is generated.

* * * * *